United States Patent
Parker (10) Patent No.: US 11,121,921 B2
(45) Date of Patent: Sep. 14, 2021

(54) DYNAMIC AUTO-CONFIGURATION OF MULTI-TENANT PAAS COMPONENTS

(71) Applicant: Microsoft Technology Licensing, LLC, Redmond, WA (US)

(72) Inventor: Ronald M. Parker, Boxborough, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/743,333

(22) Filed: Jan. 15, 2020

(65) Prior Publication Data

US 2020/0228402 A1  Jul. 16, 2020

Related U.S. Application Data

(60) Provisional application No. 62/792,580, filed on Jan. 15, 2019.

(51) Int. Cl.
  *H04L 12/24*    (2006.01)
  *G06F 9/54*     (2006.01)
  *H04L 12/14*    (2006.01)

(52) U.S. Cl.
  CPC ............ *H04L 41/0843* (2013.01); *G06F 9/54* (2013.01); *H04L 12/1432* (2013.01); *H04L 41/085* (2013.01); *H04L 41/0886* (2013.01)

(58) Field of Classification Search
  CPC ............... H04L 41/0843; H04L 41/085; H04L 41/0886; H04L 12/1432; G06F 9/54
  See application file for complete search history.

(56) References Cited

U.S. PATENT DOCUMENTS 4,872,157 A   10/1989   Hemmady et al.
4,872,159 A   10/1989   Hemmady et al.
(Continued)

FOREIGN PATENT DOCUMENTS

CN   101188520 A   5/2008
CN   102118294 A   7/2011
(Continued)

OTHER PUBLICATIONS

Butcher, Matt, "TechnoSophos: How Helm Uses ConfigMaps to Store Data", Retrieved from: http://web.archive.org/web/20181101124257/http://technosophos.com/2017/03/23/how-helm-uses-configmaps-to-store-data.html, Nov. 1, 2018, 9 Pages.

(Continued)

Primary Examiner — Todd L Barker
(74) Attorney, Agent, or Firm — Ray Quinney & Nebeker P.C.; Thomas M. Hardman (57) ABSTRACT

Embodiments of the present disclosure describe configuration agents, or "config-agents," that can identify new PaaS component configuration information when a software system instance is deployed or updated without requiring a developer to manually configure each PaaS component instance whenever a new software system instance is installed or updated. In some examples, config-agents retrieve new configuration information from configuration files associated with the software system instances such as ConfigMaps and/or Custom Resource Objects of a Custom Resource Definition type operated on by the config-agents. The config-agents can keep track of each software system instance and PaaS component instance and ensure that necessary configurations are passed onto PaaS component instances.

20 Claims, 6 Drawing Sheets

(56) References Cited

U.S. PATENT DOCUMENTS

| | | | |
|---|---|---|---|
| 4,872,160 | A | 10/1989 | Hemmady et al. |
| 4,875,206 | A | 10/1989 | Nichols et al. |
| 4,894,824 | A | 1/1990 | Hemmady et al. |
| 4,896,319 | A | 1/1990 | Lidinsky et al. |
| 4,897,874 | A | 1/1990 | Lidinsky et al. |
| 4,899,333 | A | 2/1990 | Roediger |
| 4,922,486 | A | 5/1990 | Lidinsky et al. |
| 4,942,574 | A | 7/1990 | Zelle |
| 4,958,341 | A | 9/1990 | Hemmady et al. |
| 4,977,582 | A | 12/1990 | Nichols et al. |
| 7,346,840 | B1 | 3/2008 | Ravishankar et al. |
| 7,466,694 | B2 | 12/2008 | Xu et al. |
| 7,483,995 | B2 | 1/2009 | Abhishek et al. |
| 7,596,369 | B2 | 9/2009 | Alperin et al. |
| 7,734,746 | B2 | 6/2010 | Ng et al. |
| 8,085,808 | B2 | 12/2011 | Brusca et al. |
| 8,102,813 | B2 | 1/2012 | Abhishek et al. |
| 8,364,633 | B2 | 1/2013 | Aahlad et al. |
| 8,515,488 | B2 | 8/2013 | Hillier et al. |
| 8,787,875 | B2 | 7/2014 | Ahmed et al. |
| 8,799,512 | B2 | 8/2014 | Alperin et al. |
| 9,417,897 | B1 | 8/2016 | Klompje et al. |
| 9,705,973 | B2 * | 7/2017 | Austel .................. H04L 67/025 |
| 10,348,642 | B2 * | 7/2019 | Jaisinghani ........... G06F 9/5061 |
| 2002/0023048 | A1 | 2/2002 | Buhannic et al. |
| 2003/0208609 | A1 | 11/2003 | Brusca |
| 2004/0267758 | A1 | 12/2004 | Katsurashima |
| 2006/0013191 | A1 | 1/2006 | Kavanagh |
| 2006/0114832 | A1 | 6/2006 | Hamilton et al. |
| 2006/0183469 | A1 | 8/2006 | Gadson |
| 2007/0101377 | A1 | 5/2007 | Six et al. |
| 2008/0077465 | A1 | 3/2008 | Schimpf et al. |
| 2008/0140726 | A1 | 6/2008 | Aahlad et al. |
| 2009/0042537 | A1 | 2/2009 | Gelbman et al. |
| 2009/0116381 | A1 | 5/2009 | Kanda |
| 2010/0035587 | A1 | 2/2010 | Bennett |
| 2010/0066804 | A1 | 3/2010 | Shoemake et al. |
| 2010/0188975 | A1 | 7/2010 | Raleigh |
| 2011/0047612 | A1 | 2/2011 | D'Ambrosio et al. |
| 2012/0272033 | A1 * | 10/2012 | Murphy .............. G06F 12/0253 711/171 |
| 2012/0309383 | A1 | 12/2012 | Van Phan et al. |
| 2012/0323703 | A1 | 12/2012 | Hillier |
| 2013/0007753 | A1 | 1/2013 | Jain |
| 2013/0159723 | A1 | 6/2013 | Brandt et al. |
| 2013/0268643 | A1 | 10/2013 | Chang et al. |
| 2014/0075412 | A1 | 3/2014 | Kannan et al. |
| 2014/0188971 | A1 | 7/2014 | Aahlad et al. |
| 2014/0189004 | A1 | 7/2014 | Aahlad et al. |
| 2015/0135255 | A1 | 5/2015 | Theimer et al. |
| 2016/0044130 | A1 | 2/2016 | Packham et al. |
| 2016/0182473 | A1 | 6/2016 | Cignetti et al. |
| 2016/0337841 | A1 | 11/2016 | Won et al. |
| 2018/0083985 | A1 * | 3/2018 | Ahuja ................. H04L 63/1408 |
| 2018/0352033 | A1 * | 12/2018 | Pacella ................... H04L 67/10 |
| 2020/0067763 | A1 * | 2/2020 | Vytla ....................... H04L 49/25 |
| 2020/0120168 | A1 * | 4/2020 | Nainar ................. H04L 45/302 |
| 2020/0174854 | A1 * | 6/2020 | Warshavsky ........ G06F 9/45558 |

FOREIGN PATENT DOCUMENTS

| | | |
|---|---|---|
| CN | 102202046 A | 9/2011 |
| CN | 102567080 A | 7/2012 |
| CN | 103098070 A | 5/2013 |
| CN | 103346924 A | 10/2013 |
| CN | 103368807 A | 10/2013 |
| CN | 103986665 A | 8/2014 |
| CN | 103348335 B | 7/2016 |
| CN | 103648088 B | 10/2016 |
| EP | 2648098 A2 | 10/2013 |
| JP | 2009-522933 A | 6/2009 |
| JP | 2010-141555 A | 6/2010 |
| WO | WO-2007062573 A1 | 6/2007 |
| WO | WO-2007081727 A2 | 7/2007 |
| WO | WO-2009107117 A2 | 9/2009 |
| WO | WO-2014124558 A1 | 8/2014 |
| WO | WO-2016206118 A1 | 12/2016 |
| WO | WO-2017004158 A1 | 1/2017 |

OTHER PUBLICATIONS

"International Search Report and Written Opinion Issued in PCT Application No. PCT/US2020/013631", dated Jun. 26, 2020, 15 Pages.

3GPP TR 23.722 v0.1.1 (Apr. 2017). "3rd Generation Partnership Project; Technical Specification Group Services and System Aspects; Study on Common API Framework for 3GPP Northbound APIs (Release 15)", Valbonne, France, Apr. 2017 (20 pages).

3GPP TS 23.682 v14.3.0 (Mar. 2017), "3rd Generation Partnership Project; Technical Specification Group Services and System Aspects; Architecture Enhancements to Facilitate Communications with Packet Data Networks and Applications (Release 14)", Valbonne, France, Mar. 2017 (106 pages).

European Extended Search Report issued in EP17738990.5, dated Jul. 31, 2019 (8 pages).

International Search Report and Written Opinion as issued by the U.S. Patent and Trademark office as International Search authority, received for PCT Patent Application No. PCT/US2011/055183, dated Mar. 8, 2012, 9 pages.

International Search Report and Written Opinion issued by the U.S. Patent and Trademark Office as International Searching Authority, issued in International Patent Application No. PCT/US17/13303, dated Apr. 3, 2017 (9 pages).

* cited by examiner

DYNAMIC AUTO-CONFIGURATION OF MULTI-TENANT PAAS COMPONENTS

RELATED APPLICATIONS

This application claims priority under 35 U.S.C. § 119(e) to U.S. Provisional Application No. 62/792,580, filed Jan. 15, 2019, entitled "DYNAMIC AUTO-CONFIGURATION OF MULTI-TENANT PAAS COMPONENTS," the contents of which is incorporated herein in its entirety.

TECHNICAL FIELD

The present disclosure relates to PaaS architecture, and more particularly to the process of updating PaaS components when new configurations are deployed.

BACKGROUND

In cloud computing, a user of a cloud computing service can outsource certain computing processes to third parties in order to streamline the computing experience of the user. Platform as a Service ("PaaS") is one form of cloud computing, where a user can develop and run an application without having to create and manage each and every dependent system component of the application from the ground up. For example, a user can employ various PaaS components that are designed to perform specific tasks needed by the user's application. Typical users of PaaS architecture include, but are not limited to, network operators that deploy Network Functions ("NFs") with various configurations and functionalities. These NFs (e.g., Virtual Network Functions, or "VNFs") interface with PaaS components to perform their various functions.

Example Platform as a Service ("PaaS") components include databases such as MongoDB and observability components such as Prometheus™ (key performance indicator "KPI" management, threshold crossing alerts, and historical storage of KPIs), Grafana™ (graph visualization of KPIs), ElasticSearch™ (historical storage of log messages), ElastAlert (rule-based logic to raise alerts from log messages), Kibana™ (dashboard visualization of ElasticSearch and ElastAlert activity). These PaaS components are multi-tenant in that, when implemented to support networked systems, there may be multiple distinct systems (e.g., Network Functions) making use of each of the PaaS components simultaneously. When a new tenant (e.g., each Network Function) is deployed, configurations are applied at the PaaS components. For example, a logical database name, list of document collections and their keys are provided to MongoDB™; lists of supported KPIs are uploaded to Prometheus™; identities of the endpoints from which the KPIs may be pulled are also be uploaded to Prometheus™ (sometimes referred to as "service discovery"); Dashboards that reference to the KPIs are uploaded to Grafana™; alerting rules are uploaded to ElastAlert; and dashboards to visualize log message flows are uploaded to Kibana™. However, coordinating this process for multi-tenant architectures is time-consuming and requires complicated manual execution or complex centralized tools like Ansible™ offered by Red Hat™ to automate changes across the platform and ensure that PaaS components receive the files they consume.

SUMMARY

In some embodiments, a method includes installing a service instance using a first descriptor chart, the installing comprising: installing a plurality of microservices declared in the first descriptor chart that comprise the service instance, at least one of the microservices configured to request services from an instance of a Platform-as-a-Service ("PaaS") component of a PaaS component type, and creating at least one configuration file based on the first descriptor chart; parsing, by a configuration agent associated with the PaaS component type, the at least one configuration file for configuration data associated with the PaaS component; and instructing, by the configuration agent, the instance of the PaaS component to install the configuration data.

In some embodiments, the configuration file comprises descriptors of resources, and wherein the method further comprises mounting the configuration file to the configuration agent.

In some embodiments, the service instance comprises a network function ("NF").

In some embodiments, the service instance is installed by a network operator, and the PaaS component is developed and managed by a third-party.

In some embodiments, the method further includes updating the service instance using a second descriptor chart, the updating comprising: updating at least one of the plurality of microservices declared in the second descriptor chart that comprise the service instance, the updated at least one of the plurality of microservices configured to request services from the instance of the PaaS component, and updating the at least one configuration file based on the second descriptor chart; parsing, by the configuration agent, the at least one updated configuration file to identify the update to the configuration data associated with the PaaS component; and instructing, by the configuration agent, the instance of the PaaS component to install the updated configuration data.

In some embodiments, the updating the software instance is performed by a container orchestration engine ("COE").

In some embodiments, a method includes: monitoring, by a configuration agent associated with a Platform-as-a-Service ("PaaS") component type, for a notification identifying a configuration file change in at least one configuration file directory, the at least one configuration file in the configuration file directory containing configuration data for at least one instance of the PaaS component of the PaaS component type; monitoring, by the configuration agent, a configuration of the at least one instance of the PaaS component type to identify a lack of conformity with configuration data in the configuration file directory; automatically transmitting, by the configuration agent, an instruction to the at least one instance of the PaaS component when one or more of a configuration file change or a lack of conformity is identified, the instruction comprising an instruction to install a configuration on the at least one instance of the PaaS component based on the configuration data in the configuration file directory.

In some embodiments, the at least one instance of the PaaS component is configured to service at least one microservice of a plurality of microservices comprising a network function ("NF").

In some embodiments, the change in configuration data comprises a change in data of a ConfigMap in the configuration file directory.

In some embodiments, the configuration data is associated with at least one service instance, and wherein the method further comprises updating the at least one service instance using a descriptor chart, the updating the at least one service instance causing the change in the configuration data.

In some embodiments, the at least one service instance is updated by a network operator, and the PaaS component is developed and managed by a third-party.

In some embodiments, a method includes: installing a service instance using a first descriptor chart, the installing comprising: installing a plurality of microservices declared in the first descriptor chart that comprise the service instance, at least one of the microservices configured to request services from an instance of a Platform-as-a-Service ("PaaS") component of a PaaS component type, and creating at least one resource instance based on the first descriptor chart, the resource instance having a type associated with a resource definition, the resource instance containing configuration data associated with the instance of the PaaS component; receiving, by a configuration agent that operates resource instances of the type associated with the resource definition, a notification of the creation of the at least one resource instance, the notification further comprising the configuration data associated with the instance of the PaaS component; and instructing, by the configuration agent, the instance of the PaaS component to install the configuration data.

In some embodiments, the instructing the instance of the PaaS component to install the configuration data comprises performing, by the configuration agent, an API call to the instance of the PaaS component.

In some embodiments, the service instance comprises a network function ("NF").

In some embodiments, the service instance is installed by a network operator, and the PaaS component is developed and managed by a third-party.

In some embodiments, the method further includes: updating the service instance using a second descriptor chart, the updating comprising: updating at least one of the plurality of microservices declared in the second descriptor chart that comprise the service instance, the updated at least one of the plurality of microservices configured to request services from the instance of the PaaS component, and updating the at least one resource instance based on the second descriptor chart by updating configuration data in the resource instance associated with the instance of the PaaS component; receiving, by the configuration agent that operates resource instances of the type associated with the resource definition, a notification of the update to the at least one resource instance, the notification further comprising the updated configuration data associated with the instance of the PaaS component; and instructing, by the configuration agent, the instance of the PaaS component to install the updated configuration data.

In some embodiments, the updating the software instance is performed by a container orchestration engine ("COE").

In some embodiments, a method includes: monitoring, by a configuration agent associated with a resource definition type, for a notification identifying that a declaration in a resource instance of the resource definition type has changed, the changed declaration being associated with at least one instance of a Platform-as-a-Service ("PaaS") component; monitoring, by the configuration agent, a configuration of the at least one instance of the PaaS component to identify a lack of conformity with the declaration in the resource instance of the resource definition type; automatically transmitting, by the configuration agent, an instruction to the at least one instance of the PaaS component when one or more of a declaration change or a lack of conformity is identified, the instruction comprising an instruction to install a configuration on the at least one instance of the PaaS component based on the declaration in the resource instance.

In some embodiments, the at least one instance of the PaaS component is configured to service at least one microservice of a plurality of microservices comprising an instance of a network function ("NF").

In some embodiments, the method further includes updating the instance of the NF using a descriptor chart, the updating the instance of the NF causing the change in the declaration.

In some embodiments, the instance of the NF is updated by a network operator, and the PaaS component is developed and managed by a third-party In some embodiments, the changed declaration comprises a change to a consumable of the at least one instance of the PaaS component.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

It is to be understood that the phraseology and terminology employed herein are for the purpose of description and should not be regarded as limiting.

In multi-tenant PaaS implementations, individual instances of software systems, such as NFs, can be installed as needed based on a descriptor file and input variables. Such software systems can comprise an amalgamation of microservices, each of which performs a particular service for the software system. Deployments of such software systems can request particular instances of PaaS components to provide services to their software systems based on custom configurations provided to the PaaS component instances using configuration files. As developers scale both the number of software system instances, the number of microservices in such instances, and number of instances of PaaS components that provide services to the software system instances, managing configuration information for each instance of software and PaaS components becomes cumbersome and error prone. While configuration managers such as Ansible™ can facilitate deployment and updates to such implementations, as described below, these solutions require manual scripting to keep track of configuration information for each PaaS component instance. Accordingly, embodiments of the present disclosure describe configuration agents, or "config-agents," that can identify new PaaS component configuration information when a software system instance is deployed or updated without requiring a developer to manually configure each PaaS component instance whenever a new software system instance is installed or updated. In some examples, config-agents retrieve new configuration information from configuration files associated with the software system instances such as ConfigMaps and/or Custom Resource Objects of a Custom Resource Definition type operated on by the config-agents. The config-agents can keep track of each software system instance and PaaS component instance, for example by using a namespace of each, and ensure that necessary configurations are passed onto PaaS component instances.

Figure 1:
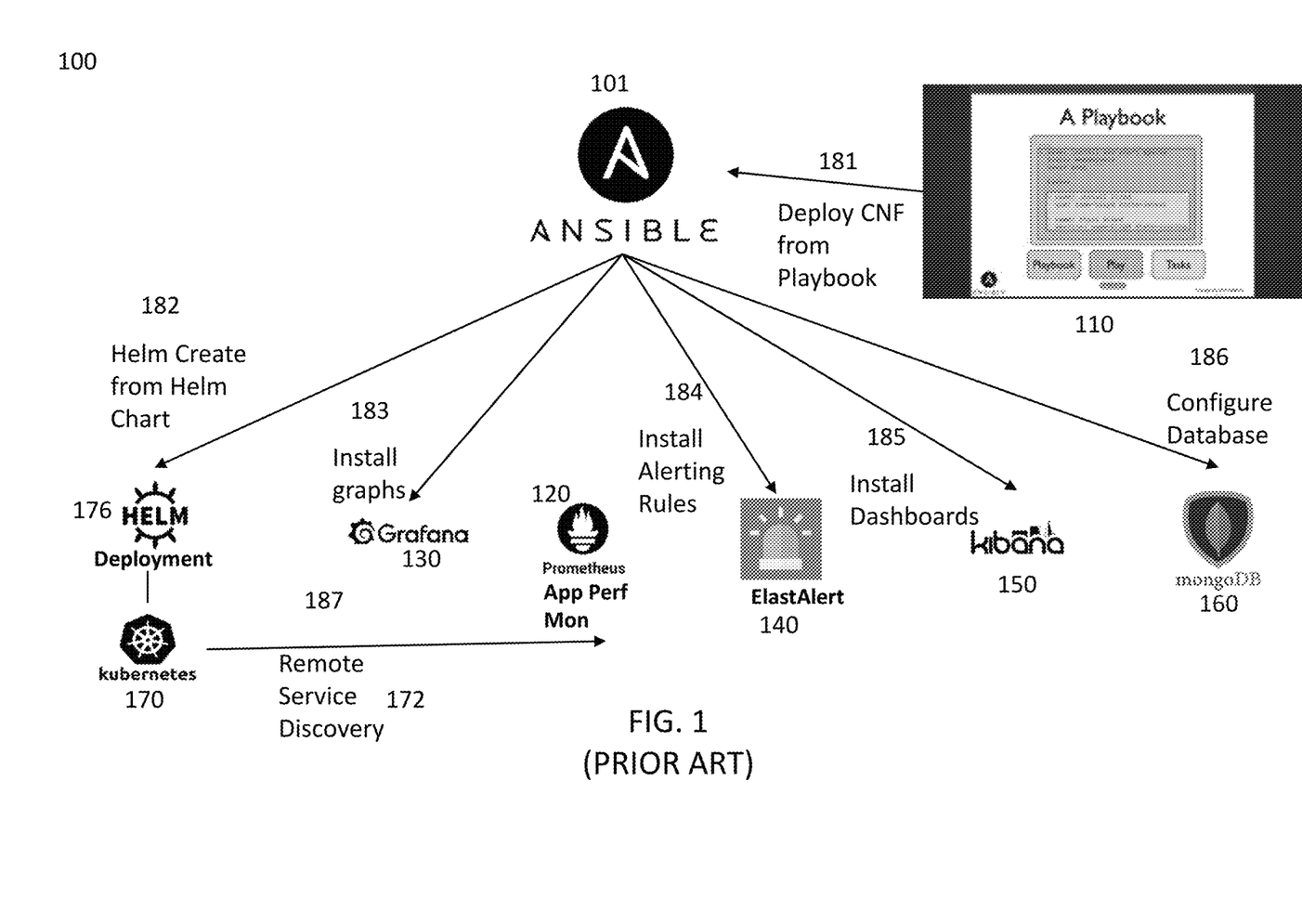
FIG. 1 is a system diagram showing a configuration of a prior art multi-tenant PaaS component configuration using Ansible™.

FIG. 1 is a system diagram showing a configuration of a prior art multi-tenant PaaS component configuration 100 using Ansible™. Configuration 100 includes Ansible™ 101, Kubernetes™ 170, and Helm™ 176, and PaaS components such as Prometheus™ 120, Grafana™ 130, ElastAlert 140, Kibana™ 150, MongoDB™ 160A/B. These components are described in more detail below. It should be appreciated that these components are merely exemplary, and can be replaced with other PaaS components that perform similar or different functions.

In general, a software system, such as a network function in a networked system, can communicate with PaaS components 120, 130, 140, 150, 160A/B to request the performance of particular services. Third-party deployers can manage PaaS component instances, which can operate in the public cloud. Users of the PaaS components, such as network operators, can customize PaaS components to serve their applications without having to create, manage, and maintain each PaaS component. Instead, specific instances of PaaS components can be deployed for use by particular software system instances (e.g., NFs), which are customized based on configuration files that are sometimes referred to by different names such as "dashboards," "schemas," etc. Thus, these PaaS components can be multi-tenant, in that multiple software systems (e.g., NFs) can use one or more instances of these PaaS components based on particular configurations fed to the PaaS components.

Helm™ 176: an open source system orchestrator. Helm™ 176 is a package manager that manages software deployments, such as deployments of NFs. Helm™ 176 takes descriptor files, referred to as Helm™ Charts, as input and decomposes them into individual Kubernetes™ commands. For example, a Helm™ Chart can be deployed with a command such as 'helm install <chart.name><variable values> . . . ', where <chart.name> is the name of a particular chart, and the <variable values> are variables that are used to customize a particular instance of a software system generated from the Helm™ Chart. Multiple instances of software systems can be generated from the same Helm™ Chart using different variable values. According to some embodiments, a Helm™ Chart is structured like a Network Function ("NF") descriptor. It can contain the instructions for Kubernetes™ (a container orchestration engine described below) to deploy the microservices that comprise the NF. For example, the Helm™ Chart can read as a set of declarations that declare various microservices, etc. that will make up a software system, such as a NF. This can include elements such as, but not limited to, versioned docker image file names, as well as metadata such as replica counts, auto-scale policies, service definitions (e.g., an abstraction to hide the individual members of the a microservice type's replica set), and any Custom Resource Definitions ("CRDs,"

which can be arbitrary and changeable data that can be injected by the COE ("Core Orchestration Engine," e.g., Kubernetes™, Docker Swarm™, or Mesophere™) to the running microservices). The docker images can be used to deploy microservices (e.g., pods) that make up the NF. The Helm™ Chart can also include additional data and files that are necessary to configure the microservices. In addition, a ConfigMap, which can be a dictionary of configuration settings that contains configuration information to be read from microservices (e.g., as a key-value pair of strings), can be declared in the Helm™ Chart itself. The Helm™ Chart can also indicate to which microservices the ConfigMaps should be mounted (as a file) such that the microservices can see the configuration information contained in the respective ConfigMap. As described in more detail below, unlike in FIG. 1, according to some embodiments, the metadata in a Helm™ Chart can be used to specify certain files to be consumed by various PaaS components. ConfigMaps allow for configuration files to be separated from image content in order to make microservice deployment more flexible. Furthermore, as described in more detail below with reference to FIGS. 2-6, by including these files in the Helm™ Chart, these files may be passed through to the various PaaS components without requiring coordination software like Ansible. Although Helm™ 176 and Helm™ Charts are discussed in the present disclosure, it should be appreciated that other types of orchestrators that allow for specification of docker images for deploying software and metadata associated with the same can be used.

Kubernetes™ 170: an open source container orchestration engine ("COE") for automating deployment. Kubernetes™ can assist in deploying, scaling, and managing software systems. For example, Kubernetes™ can manage addressing, scheduling, and scaling of instances of services, which can be made up of multiple pods containing containers.

Prometheus™ 120: an open source KPI/Statistics manager. Prometheus™ 120 includes a Time Series Database ("TSDB") for intermediate term storage. Prometheus™ 120 can be regularly synchronized with list of endpoints from which KPIs are periodically gathered. Service discovery can refer to the process by which Prometheus™ 120 discovers various endpoints (e.g., nodes) from which to collect metrics. An instance of Prometheus™ 120 that serves a particular NF needs to be provided with this configuration information in order to learn about which contain KPIs to be gathered.

Kibana™ 150: an open source dashboard engine that allows visualization of log flows and alerts. Multiple instances of Kibana™ 150 can be deployed to serve various software systems, such as NFs. Each Kibana™ 150 consume a dashboard file containing information about how to generate a particular dashboard, which it can use to construct queries to ElasticSearch for data to visualize. According to some embodiments, dashboard files can be created manually via the Kibana tool in Kibana™ 150. A user can create a dashboard, add widgets to it, specify the log filters that can be applied to determine which logs match to the added widget, and finally save the dashboard. Alternatively, network operator can construct a set of these dashboards to accomplish particular desired functionalities and then add them to a source code control system such that they are released along with the software. In some embodiments, a release of software is comprised of at least two things: a set of versioned docker images and the Helm™ Chart for the particular NF. Thus, the dashboards can be declared within the Helm™ Chart. The packaging of the Helm™ Chart can be done during the build of the NF release.

ElastAlert 140: an open source plugin to Kibana™ that can receive configuration information in the form of alert rule files which it uses to construct appropriate queries to ElasticSearch™, which is an intermediate term storage for log messages. According to some embodiments, each microservice emits log messages, for example, by processes such as "printf" or "stdout" file descriptors.

MongoDB™ 160A/B: an open source NoSQL database. MongoDB™ 160A/B creates particular instances of logical databases based on configuration information contained in schema files. As explained below, schema files can delineate the database structure and corresponding nodes from which data is to be collected. Each instance of MongoDB™ 160A/B can be for a particular software system, such as a NF. Instances of MongoDB™ 160A/B can collect key information via API calls to various nodes in the system, based on information contained in the schema. According to some embodiments, when a new NF is deployed (e.g., via a 'helm install' command), an instance of MongoDB™ 160A/B can be pre-instructed regarding a logical DB name that the NF expects to use, document collections ("repos") within the logical DB, and the primary/secondary key information for each repo based on a schema file. APIs can be offered by MongoDB™ 160A/B within the set of TCP-based APIs defined by MongoDB™ 160A/B. After such steps have been accomplished, microservices within the newly orchestrated NF can write and read documents to MongoDB™ 160A/B using the proprietary TCP-based APIs that are defined by MongoDB™ 160A/B.

As shown in FIG. 1, in prior art systems, Ansible™ 101, as a higher-level configuration manager, is responsible for deploying new distinct software systems such as NFs and pushing all relevant configurations to instances of the PaaS components used by that new distinct software system. Ansible™ 101 does so via Playbooks 110, which are scripts that are written to conform to Ansible™ 101 requirements. When a new software system is deployed, Ansible™ 101 may need to push down information to each PaaS component instance so that each PaaS component instance is aware of what the new system requires of it. For example, Ansible™ 101 may push Helm™ Create 182 from a Helm™ chart to Helm™ 176, install new dashboards (e.g., files with information about graphing templates) 183 for Grafana™ 130, install new alerting rules 184 for ElastAlert 140, install dashboards 185 for Kibana™ 150, and configure database(s) 186 for MongoDB™ 160A/B, all in new instances of each PaaS component that are meant to serve a particular NF deployed via the Helm™ Chart. Some or all of these configurations are declared in playbooks 110. Playbooks take the form of scripts. These scripts can be prepared by an IT or other operational professional. Thus, in order to ensure that PaaS component instances receive the correct configuration to provide services to a new NF instance, someone must manually script in a Playbook that the information is to be provided to particular PaaS component instances. The construction and maintenance of these scripts in Playbooks can be elaborate and time consuming, and make the process of updating various components or adding new NFs/microservices more labor intensive.

Higher level automation software like Ansible™ 101 present a number of drawbacks. For example, when deployed at production scale, it becomes awkward, inefficient, and error-prone to utilize this approach. Deployment and automation solutions like Ansible™ 101 and its Playbooks 110 must capture significant software system-specific knowledge in order to know exactly how to coordinate the deployment of new software and the update of the respective PaaS components that the new software will utilize. For example, someone must specify a particular Helm™ Chart from which to deploy the software instance, and further specify, as discussed above, how each PaaS component instance is to learn of configuration to service that particular software instance. It should be appreciated that the PaaS component instances can be instantiated using any suitable methods including, but not limited to being deployed via a Helm™ Chart or being created by inputting data via a graphical user interface or via an API called from a script. Thus, when deploying a new software instance, someone must configure the Playbook to explicitly configure PaaS components to create and/or update PaaS component instances. Furthermore, each time an existing system is upgraded, the Ansible™ Playbooks 110 potentially need to be updated. For example, for new deployments or if a software update requires a new or updated PaaS component instance, the Playbooks 110 will need to be updated to specify that that PaaS component instance is to receive the correct configuration information. In addition, the Ansible Playbooks 110 do not sufficiently handle the needs of multiple versions of distinct systems. Accommodating different versions that may have different configuration needs with respect to the multi-tenant PaaS components is challenging. Versions can refer to either the version of a particular PaaS components or the version of a particular NF. According to some embodiments, a PaaS component instance can change versions and thus change its approach to configuration, for example using different APIs or different structure of the data it consumes. Such different data structures can relate, for example to the file format of a Kibana™ dashboard, for example changing from JSON to YAML, or simply adding new fields. For versioning of a NF, a new microservice version may add new log messages, which can require new versions of ElastAlert rules files and/or Kibana™ dashboards to accommodate such log messages. Another example can involve the introduction of new KPIs. According to some embodiments, a new microservice version can modify the way it interacts with a database, for example by introducing new collections or adding more secondary keys to existing collections. According to some embodiments, an upgrade to a NF can employ a new type of microservice that did not previously exist. While a NF can be upgraded to a new version using a 'helm upgrade' command, someone must still add updated configuration information to be provided to PaaS components in the Playbook 110.

There are further drawbacks to this system. On a significant number of prior art deployments, there is no universal scripting environment. Instead, before or after deploying a particular software system (e.g., an NF), configuration or reconfiguration of the multi-tenant PaaS components is performed manually via a CLI or GUI interface. This creates significant disadvantages for production scale environments, where many manual configurations are time-consuming and difficult to coordinate. In addition, particular deployments can require additional debugging time.

Figure 2:
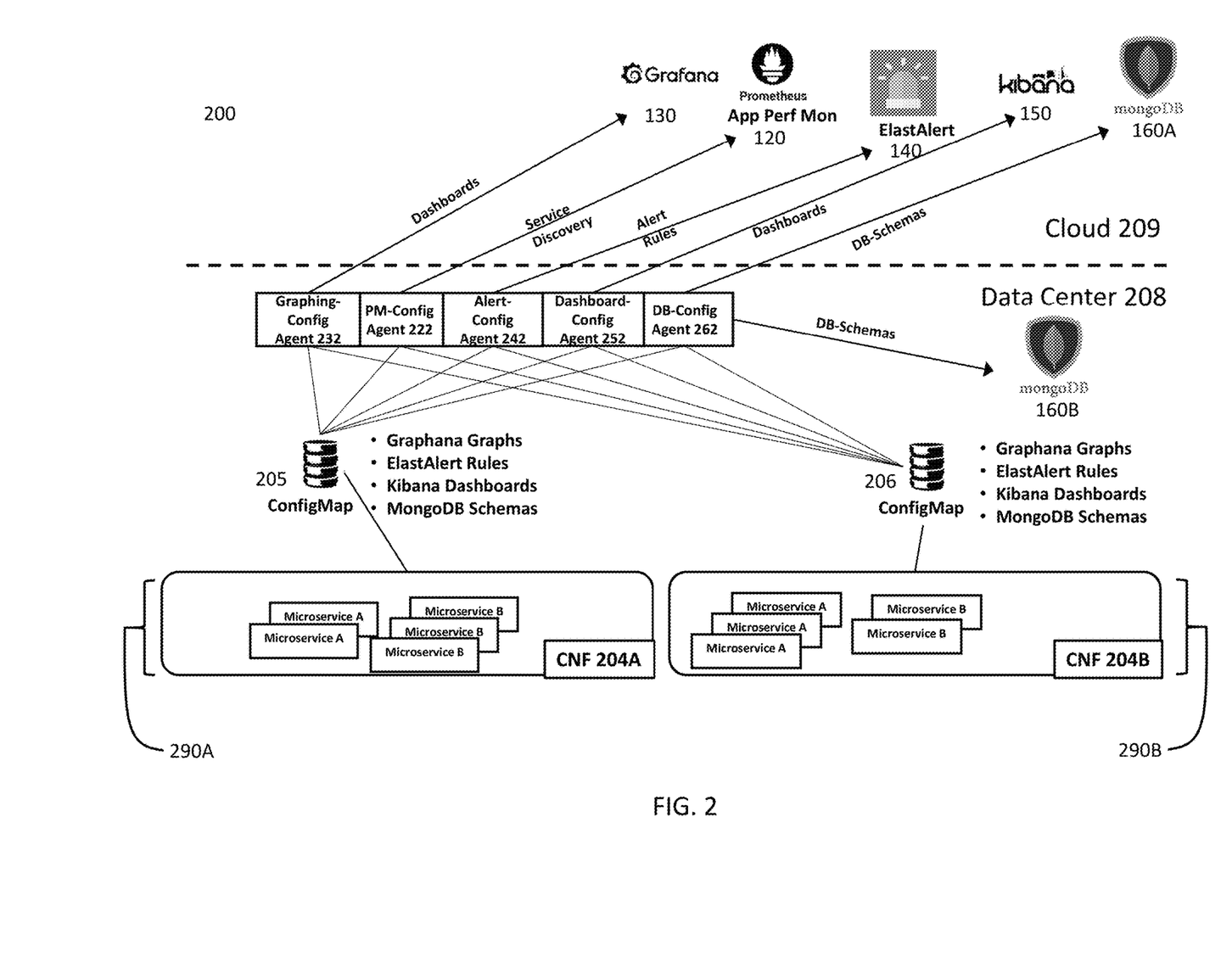
FIG. 2 is a system diagram showing an exemplary auto-configuration architecture for multi-tenant PaaS components, according to some embodiments.

FIG. 2 is a system diagram showing a multi-tenant PaaS component configuration 200 with config-agents, according to some embodiments. The configuration 200 includes similar components to the system 100, including Prometheus™ 120, Grafana™ 130, ElastAlert 140, Kibana™ 150, and MongoDB™ 160A and 160B. The system 200 also includes CNF 204A, CNF 204B, microservices 290A, microservices 290B, ConfigMap 205, ConfigMap 206 and graphing-config-agent 232, PM-config-agent 222, alert-config-agent 242, dashboard-config-agent 252, and database ("DB")-configagent 262. These elements are described in more detail below. It should be appreciated that these elements are merely exemplary, and can be replaced with other PaaS components that perform similar or different functions. It should also be appreciated that the config-agents can be structured as separate microservices on each CNF 204A, 204B.

As shown in FIG. 2, one or more NFs or other software systems (e.g., CNFs 204A, 204B) can be implemented using a microservices architecture. Accordingly, each of CNFs 204A, 204B comprise at least one microservice 290A, 290B, respectively, that provide one or services (e.g., functional logic) via API calls on behalf of the CNF. In some embodiments, a CNF can be considered to be a federation of microservices, each of which performs one service associated with the function of the CNF. Services can include, for example, functional logic such as call control logic or MME tracking area management logic. According to some embodiments, microservices 290A, 290B converse through APIs (for example, RESTful over HTTP or gRPC). According to some embodiments, the microservices 290A, 290B can be dynamically and multiply instantiated based on network load. As discussed above, a COE, such as Kubernetes™, can manage microservices for each CNF.

In some embodiments, the CNFs 204A, 204B can operate on a PaaS architecture, and can therefore each access instances of PaaS components, for example, Prometheus™ 120, Grafana™ 130, ElastAlert 140, Kibana™ 150, and MongoDB™ 160A/B, to accomplish particular functions associated with each PaaS component. According to some embodiments, PaaS components instances themselves can also be dynamically scalable based on the load which they receive.

In some embodiments, each CNF 204A, 204B includes at least one ConfigMap 205, 206, respectively. ConfigMaps 205, 206 can be used in implementations that employ Kubernetes. In such implementations, a ConfigMaps can be specified in a Helm™ Chart and implemented for each deployed CNF. According to some embodiments, each deployed CNF can have many ConfigMaps. A ConfigMap can be, in some embodiments, a resource that allows for injection of configuration data into a pod or other resource. ConfigMaps can be separated so as to be mounted separately to distinct microservice types. In an example, the type of data used by the DB-config-agent can be located in one ConfigMap which includes the collection of DB requirements files of each microservice type in the CNF that makes use of the DB. Similarly, according to some embodiments, the collection of Kibana™ dashboards that can be released with each microservice type can be orchestrated into their own ConfigMap for purposes of mounting it to the Dashboard-config-agent. According to some embodiments, mounting can denote that a ConfigMap is visible in a microservice's local files system at some specified coordinate, such as /etc/config-maps/dashboard-config-map/<actual-config-map-file>.

In some embodiments, the contents of the ConfigMaps 205, 206 can be mounted to each microservice 290A, 290B, respectively, as a file system containing the files that were present in a Helm™ Chart. The Helm™ Chart can include raw data that can be put into a ConfigMap, such as, for example, the Kibana™ dashboard files (i.e., configuration information for an instance of a Kibana™ PaaS component), and can also include instruction that such data be assembled into a ConfigMap and a directive that one or more microservice types should mount the ConfigMap at a given file system path. According to some embodiments, the Config-Map is a general mechanism that is similar to an "environment variable" but, that can be changed during the lifetime of the running microservice. According to some embodiments, the ConfigMaps discussed throughout the present disclosure can instead be replaced by Custom Resource Definitions ("CRDs") in an API-oriented solution rather than a file-oriented solution, as described in more detail with reference to FIGS. 5 and 6.

According to some embodiments, CNFs 205, 206 can be associated config-agents associated with each PaaS component, such as Prometheus™ 120, Grafana™ 130, ElastAlert 140, Kibana™ 150, and MongoDB™ 160A/B, of the PaaS component configuration 200. Each config-agent can be managed by a separate entity from the PaaS component and can be singleton microservice that is deployed as a member of each CNF 204A, 204B that can make API calls to the PaaS component instances associated with the config-agent. As described in more detail with reference to FIGS. 3-4, each config-agent is configured to extract files from the mounted ConfigMap 205, 206 and recognizes dynamic changes in the structure thereof (e.g., additions, changes, or deletions of configuration information). The extracted files can be renamed to include the CNF ID. This can be performed, for example, to ensure that there are not any naming collisions. For example, two CNFs may have different life cycles (e.g., upgrades at different times), which means their metadata may diverge. Accordingly, by naming files based on the CNF instance name, the life cycle of these files can also be independently controlled separately from other CNF instances. The files can then be installed in each PaaS component using API calls to enable the operation of each respective component. For example, a config-agent can pass changes to configuration information for a specific instance of a PaaS component associated with a CNF via an API call to that PaaS component instance. Accordingly, when the ConfigMap is updated during an upgrade, the config-agents can identify the updated portion of the ConfigMap and synchronize the relevant PaaS component instances with the update.

According to some embodiments, CRDs can be used in addition to or instead of ConfigMaps. A CRD can be used to define a consumable of a PaaS component, such as a schema for MongoDB™. The CRD can be provided to a COE, such as Kubernetes™. Once defined, the CRD becomes one of the types of resources that the COE (e.g., Kubernetes™) can understand.

In some embodiments, particular resource instances, such as Custom Resource Objects ("CROs") can be deployed via a Helm™ Chart. These CROs are of a type defined in the CRD, and can contain specific information therein, such as configuration information for a PaaS component instance. For example, when software or upgrades are deployed, the Helm™ Chart can include declarations of various CROs, which can include a CRD type (already understood by Kubernetes™, name, and indication to Kubernetes™ 170 that it exists as a CRO. Furthermore, in the Helm™ Chart, certain files can be specified to be included in the CRO which include, for example, dashboard files to be consumed by a PaaS component instance such as Grafana™ 130. In another example, a particular schema CRO can be created of the type defined in a schema CRD, and can contain information about a database (e.g., KPIs, etc.) for a MongoDB™ instance. Each CRO can contain multiple files or a single file. CRDs operate using a publish and subscribe model where publishing occurs at deployment of the CROs, for example, when they are specified in a Helm™ Chart acted upon by Helm™. Although the present disclosure describes operation of Config-Agents based on information in CROs, ConfigMaps, or both, a person of skill in the art would understand from the present disclosure that Config-Agents can operate in other software environments using other types of resources intended to be bound to particular instances.

In some embodiments, config-agents can be created to operate CROs of certain CRD types in order to provide new, changed, or deleted configuration information to a PaaS component instance. In such embodiments, a microservice, such as a config-agent, can be instantiated and configured to inform the COE (e.g., Kubernetes™) that it operates resources of the type defined by a CRD (i.e., is subscribed to CROs of the CRD type). For example, a developer of the PaaS-config-agent microservice can document the type, name, and structure of the CRD that it consumes. When a new CRO of the CRD type is deployed, or when a CRO of that type is updated, in a Helm™ Chart, the COE (e.g., Kubernetes™) 170 can make the CROs, including the files referenced therein, available to microservices subscribing to that particular CRD type. For example, the COE can inform that microservice (e.g., config-agent) that a CRO of that type has been created. The microservice can then read configuration information from the CRO via an API call, and then place another API call to the associated PaaS component instance to provide that information so that the PaaS component instance can properly supply services to an NF. Thus, microservice config-agents that subscribe to particular CRD types can listen for CROs to which it subscribes, which may be new or updated, such as those having dashboard files embedded therein, and then forward them to respective PaaS component instances. In this way, developers do not need to coordinate the process by which each respective PaaS component instance receives new or updated files. Config-agents and associated CNFs can operate using ConfigMaps, CROs, or both, in order to adequately provide configuration information to PaaS instances.

In some embodiments, both CROs and ConfigMaps can be used in the same system 200. For example, one Helm™ Chart can be deployed to instantiate CNFs that provide configuration information only in ConfigMaps, while a second Helm™ Chart can be deployed to instantiate CNFs that provide configuration information only via CROs. In another example, on Helm™ Chart can be deployed to instantiate a CNF that provides configuration information to one PaaS component instance using information read by config-agents read from ConfigMaps, while a second PaaS component instance can receive configuration information from a config-agent that receives such information from an API call to a CRO of the CRD type it operates. In any of these examples, a configuration manager, such as Ansible™, is not needed to ensure that configuration is provided to PaaS component instances. Instead, when an NF is instantiated or updated from a Helm™ Chart that may specify new, changed, or deleted configuration information for one or more PaaS components, config-agents associated with each PaaS component can pass updated configuration information to their respective PaaS components instances without requiring someone to manually code such an action in an Ansible™ playbook.

According to some embodiments, config-agents 232, 222, 242, 252, 262 can take the form of singleton microservices. Config-agents 232, 222, 242, 252, 262 can be declared in and installed via a separate Helm™ chart, which can provide the config-agents with information on how to discover updates to PaaS instance configurations (e.g., via monitoring for changes of a certain type to ConfigMaps or informing Kubernetes™ 170 that it operates CROs of particular CRD types. When a new piece of software containing one or more new types of microservices (e.g., via a Helm™ Chart) is instantiated or updated to implement new configuration on a PaaS component instance (e.g., dashboards in Grafana™ 130, endpoints to be accessed by Prometheus™ 120, alert-rules in an alert file to be implemented by ElastAlert 140, dashboards to be consumed by Kibana™, or schemas to be consumed by MongoDB™ 160A/B) for one of CNFs 204A, 204B, the respective Graphing-, PM-, Alert-, Dashboard-, and/or DB-config-agent 232, 222, 242, 252, and/or 262 can extract files from ConfigMaps 205 or 206, rename them to include the CNF ID, and install them in an instance of the PaaS component 130, 120, 140, 150, 160A/B associated with the CNF via API calls. Accordingly, one or more of config-agent 232, 222, 242, 252, 262 can also recognize new or dynamic changes to the ConfigMaps 205, 206 and synchronize with instances of PaaS components 120, 130, 140, 150, 160A/B via API calls without having to specify in a Playbook or the Helm™ Chart that changed the ConfigMap which particular PaaS component instances need updated configuration information. For synchronization, in some examples, Microservices will utilize a Linux file system change notification mechanism (e.g., inotify) in order to get a callback from Linux when a change is detected. Kubernetes™ can be responsible for remounting the regenerated ConfigMap such that inotify can detect it and inform the microservice.

In some embodiments, files extracted from the Config-Maps can include Grafana™-specific files that instruct it how to paint a web display in a browser and which KPIs to request from the data source (e.g., Prometheus™) in order to plot the lines on the web display In some embodiments, files extracted from the Config-Maps can include files that cause an instance of Prometheus™ 120 to perform remote service discovery (e.g., provide Prometheus™ 120 with endpoints (microservice instances) that are to data available to it. Since Prometheus™ 120 can be hierarchical—a parent Prometheus™ instance can need to know which child Prometheus™ instances make (aggregated) data available to it, PM-config-agent 222 can automate synchronization of a CNF microservice members list with Prometheus™ 120 to enable automated data collection by Prometheus™ 120 for hierarchical instances.

In some embodiments, files extracted from the Config-Maps can include alert-rule files containing alert rules. An alert rule can be associated with a log message declaring that database connectivity has been lost—an operator may have created such a rule, declaring that this type of log message should result in a human detectable notification over email, SMS, slack, or many other communications schemes. Alert-rule files can be consumed by an instance of ElastAlert 140.

In some embodiments, files extracted from the Config-Maps can include dashboard files to be consumed by an instance of Kibana™ 152. For example, an SMF-call-control microservice can have an associated dashboard constructed to view log activity emanating from the SMF-call-control, which can contain filters used to identify the specific log messages that are desired to be displayed in widgets on the dashboard (via a web browser).

In some embodiments, files extracted from the Config-Maps can include DB-config-schema files to be consumed by an instance of MongoDB™ 160A/B to create or modify a logical DB. In some examples, each associated set of schema files associated with a tenant can use the same file names to refer to different files for each tenant.

As described throughout the present disclosure, the information listed above can instead be retrieved by a config-agent 232, 222, 242, 252, or 262 via an API call to a CRO after receiving a notification that a CRO of the CRD type monitored by the config-agent has been instantiated.

As shown in FIG. 2, PaaS components can be multiple instantiated. For example, there are two instances of MongoDB™: 160A and 160B. In some embodiments, multiple network functions 204A, 204B can be served by the same PaaS component instance, such as Grafana™ 130. In some embodiments, each network function 204A, 204B can be serviced by a single PaaS component instance, such as MongoDB™ 160A and 160B, respectively. In some embodiments, PaaS components can be located in the cloud 209, while NFs 204A, 204B and configmaps 205, 206 are located in a data center 208. However, a person of skill in the art would understand that NFs 204A, 204B; ConfigMaps 205, 206; Config-Agents 232, 222, 242, 252, and 262; and/or PaaS components 130, 120, 140, 150, 160A, and 160B could be located in any configuration spread across multiple or a single data center 208 and/or with some or all elements residing in the cloud 209.

Figure 3:
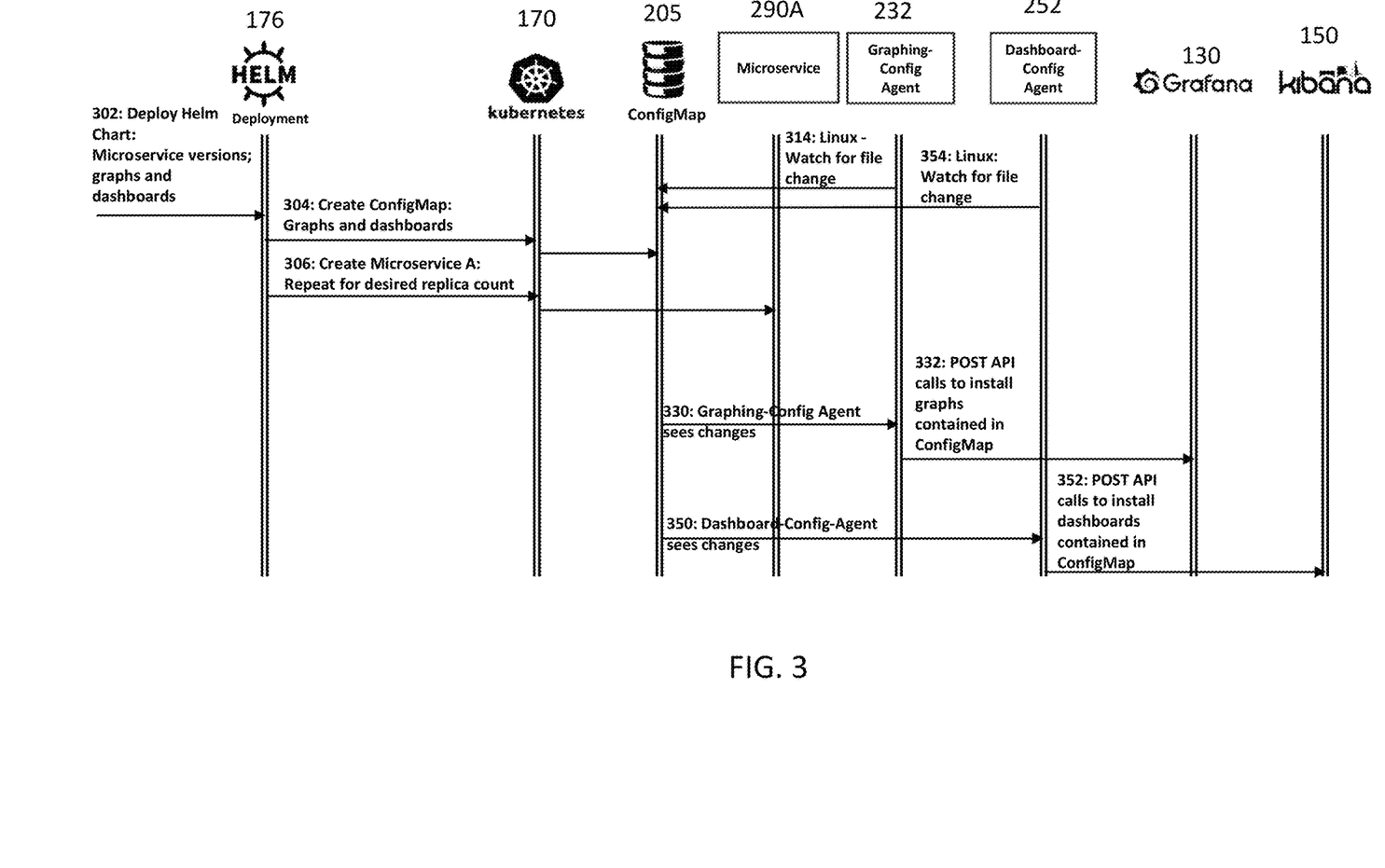
FIG. 3 shows a call flow diagram of an exemplary PaaS auto-configuration during cloud-native network function ("CNF") deployment, according to some embodiments.

FIG. 3 is a call flow diagram showing an exemplary PaaS auto-configuration during CNF instantiation (e.g., installation), according to some embodiments. At step 302, a 'helm install' command can be called for a new CNF instance 204A, which is made up of at least one microservice, Microservice 290A, based on a Helm™ Chart. As discussed above, Microservice A 290A can assist with one portion of a NF, such as SMF call control, AMF call control, or AMF Tracking Area Management. Other microservices are contemplated. At step 304, as discussed above, a ConfigMap 205 can be created, which can include configuration information contained in the Helm™ Chart to be consumed by PaaS components (e.g., dashboards to be consumed by Grafana™ 130 and dashboards to be consumed by Kibana™ 150). The ConfigMap 205 allows for deployment of such information, which can take the form of files that are contained in the Helm™ Chart, to be passed through to PaaS component instances and to be mounted as a file system to the running microservice. At step 306 Helm™ 176 can provide, via the Helm™ Chart, instructions for Kubernetes™, which coordinates with the container runtime agent (e.g., Docker or a CRI-O) to create at least one instantiation of Microservice 290A based on the docker images contained in the Helm™ Chart. The number of instantiations can also be declared in the Helm™ Chart.

Config-agents 232, 252 can continuously or periodically watch Linux for file changes at 314 and 354 (e.g., by issuing an inotify watchpoint to Linux for a file directory such that the software is notified with an event if there are any file deletes, adds, or modifies in the watched directory). Accordingly, when new CNFs are deployed or upgraded, for example via "helm install" or "helm upgrade" commands, config-agents simplify deployment automatically updating instances of PaaS components like Grafana™ 130 and Kibana™ 150. Thus, deploying new metadata to PaaS components instances does not require scripting commands that cause new PaaS component consumables to be installed to respective PaaS component instances, but rather config-agents continuously monitor for new files and pass them to respective PaaS components as needed. Once config-agents have been implemented, a developer need only declare such files in a Helm™ Chart using ConfigMaps, and the config-agents will take care of ensuring that they are properly installed on respective PaaS components instances.

In steps 330, 350, Graphing- and Dashboard-config-agents 232, 252 see changes to ConfigMap 205, including new dashboards. According to some embodiments, this involves gaining access to docker images that each respective config-agent runs and metadata, such as ConfigMaps, that should be mounted (such as that built by Helm™ and Kubernetes™ from data embedded in the Helm™ Chart). These steps can be accomplished in tandem or at different times. The config-agents 232, 252 can parse the changes new configurations that relate to the particular PaaS component which they serve. Upon identifying a new configuration, the config-agent 232, 252 can identify which PaaS component instance requires this new configuration (e.g., by using a namespace of the NF instance with which the configuration information is associated) and use POST API calls 332/352 to install the dashboards contained in the ConfigMap to Grafana™ 130 and Kibana™ 150, respectively. According to some embodiments where such an API call is not available, a separate config-agent can be deployed at the PaaS component in order to receive updated configurations (e.g., dashboards) and manipulate files local to the config-agent to accommodate the new configurations. According to some embodiments, each config-agent can be specifically designed to relay data to its respective PaaS component instance in the manner required by that PaaS component. For example, for ElastAlert™, a file that is locally mounted to ElastAlert can be changed, where the file is not a ConfigMap mount. In such an example, the system can run a "sidecar"—a new type of container that runs alongside the ElastAlert container in a manner where their lifecycle is conjoined. The sidecar can have all the privileges of the ElastAlert container, including the ability to manipulate its files. According to this example, the config-agent, as part of a CNF, can be the client side of the API relationship and the sidecar, as part of ElastAlert, can be considered to be on the server side. Accordingly, a remote API scheme can be implemented for this type of communication where none existed before. In an example, the sidecar and the ElastAlert Container can reside in the same Kubernetes™ pod.

Figure 4:
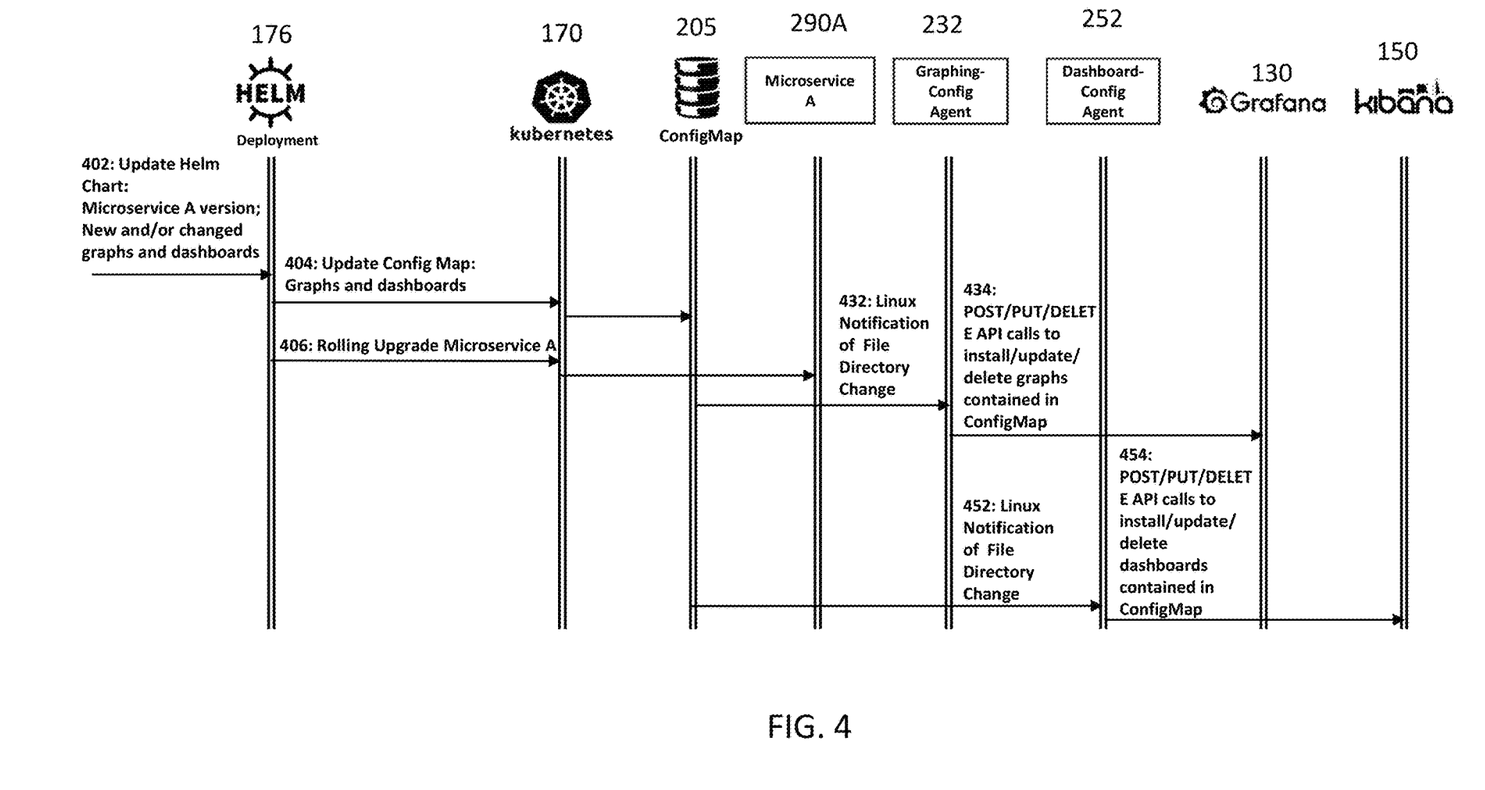
FIG. 4 shows a call for diagram for a PaaS auto-configuration during a microservice upgrade, according to some embodiments.

FIG. 4 is a call flow diagram showing a PaaS auto-configuration during a microservice upgrade, according to some embodiments. At 402, a Helm™ Chart is updated, for example, by a developer delivering a new version thereof that indicates new or different docker image versions and/or sets of metadata. This can be, for example, a "child" Helm™ Chart associated with a particular CNF comprising microservices that is referenced in a top-level Helm™ Chart. Thus, according to some embodiments, the update may be, for example, to a particular microservice (Microservice A) or for a number of microservices in the CNF. Updates can also involve, for example, new, changed, or deleted configuration information for PaaS components, such as new, changed or deleted dashboards. When the top-level Helm™ Chart is updated to reference the new "child" Helm™ Chart, a "helm upgrade" command can be performed that associates an already-deployed CNF with the new top-level chart. Helm™ 173 can then decompose the Helm™ Chart and make calls to Kubernetes™ to effectuate the required changes to the already-deployed CNF. In such cases, Helm™ 176 can call Kubernetes™ to provide an update in step 404, which Kubernetes™ can use to replace files in ConfigMaps (or replace CRD objects for CRD implementations). Similarly, Helm™ 176 can update Microservice A 290A, for example on a rolling basis, by sending an update in step 406.

After ConfigMap 205 is updated, the Graphing- and Dashboard-config-agents 232A, 252A can identify changes in the ConfigMap, for examples based on file directory changes via receipt of notifications 432 and 452, respectively, as discussed above. In some embodiments, Linux may send a notification to config-agents 232, 252 of file directory changes as discussed above. For example, where files have been replaced in response to the updated Helm™ Chart, Linux can notify any microservice (e.g., config-agents 232 or 252) to which the ConfigMap is mounted that a change in the files has occurred. After determining (e.g., being notified of) changes to the ConfigMap 205, the Graphing- and Dashboard-config-agents 232, 252 can send and/or install updates 434 and 454 including new dashboards to Grafana™ 130 and Kibana™ 150, respectively. Accordingly, higher level provisioning software like Ansible™ is not required in order to ensure that instances of PaaS components like Grafana™ and Kibana™ are kept up to date with new configurations across each CNF. Instead, config-agents become aware of updates to the ConfigMap and manage updates to individual components automatically. Such a system is scalable for larger deployments, and can significantly reduce costs for upgrading where a large number of open source components are used. Furthermore, the upgrade process does not require a single part of the system to both keep track of which CNFs use particular PaaS components that will need to be updated and coordinate the updating process. Thus, as a CNF is instantiated or updated to require different configurations of PaaS components, the respective PaaS component instances associated with that CNF are automatically updated to meet those requirements.

Figure 5:
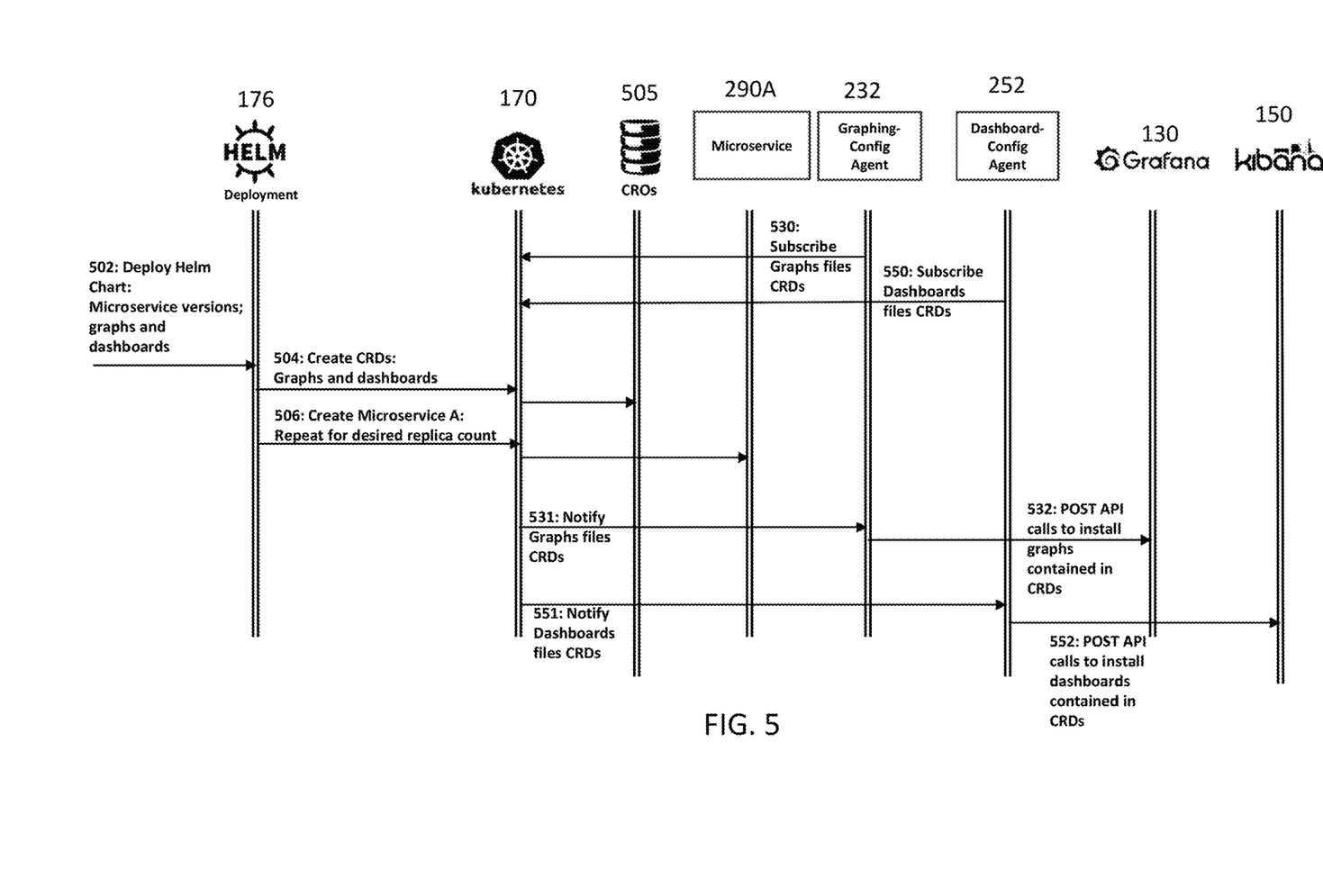
FIG. 5 shows a call flow diagram of an exemplary PaaS auto-configuration during cloud-native network function ("CNF") deployment, according to some embodiments.

FIG. 5 is a call flow diagram showing an exemplary PaaS auto-configuration during CNF instantiation using CRDs, according to some embodiments. As discussed above, CRDs can be used by config-agents instead of, alongside, or in place of ConfigMaps. At step 502, a 'helm install' command can be called for a new CNF instance 204A, which is made up of at least one new microservice, Microservice 290A, based on a Helm™ Chart. As discussed above, Microservice A 290A can assist with one portion of a NF, such as SMF call control, AMF call control, or AMF Tracking Area Management. Other microservices are contemplated. At step 504, Helm™ 176 instructs Kubernetes™ 170 to instantiate a CROs of certain CRD types (which can be declared and deployed in a separate Helm™ Chart prior to step 504 such that Kubernetes™ understand such CRD types), such as CRO 505 having, for example, new graphs or dashboards contained therein as declared in the Helm™ Chart. As discussed above, CRO 505 can be constructed such that subscribing microservices can see their contents, for example by completing API calls thereto. In step 506, Microservices are created and replicated based on docker images and metadata contained in the Helm™ Chart. For example, Microservice A (290A) is created.

At step 530, the Graphing-config-agent 232 can subscribe to (e.g., informed Kubernetes™ 170 that it operates) CROs of a particular CRD type (e.g., for Grafana™ 130) that publish specified dashboard files for which the Graphing-config-agent 232 is configured to watch. This can occur before the Helm™ Chart is installed in 502. In step 531, Kubernetes™ 170 notifies the Graphing-config-agent 232, which is subscribed to the CRO 505, that dashboard files are available and passes the files contained in the CRO 505 to the Graphing-config-agent 232. Graphing-config-agent 232 can then identify the correct PaaS component instance (e.g., via a namespace of the CNF with which the CRO 505 is associated) and make a POST API call to the particular instance of Grafana™ 130 to install these dashboards contained in the CROs by indicating that they should add a fully specified object, remove an object, and/or over write an object with a fully specified replacement value in step 532. The API call can also indicate the new CNF instance 204A which is to be associated with a new instance of the PaaS component Grafana™ 130. Accordingly, an instance of Grafana™ 130 is provided with new dashboards upon deployment of the CNF without requiring special scripting in the Helm™ Chart or an Ansible™ Playbook specifying that they be installed. Similarly, at 550, the Dashboard-config-agent 252 can subscribe to CROs of a particular CRD type (e.g., for Kibana™ 150) that publish specified dashboard files for which the Dashboard-config-agent 252 is configured to watch. This can occur before the Helm™ Chart is installed in 502. In step 551, Kubernetes™ 170 notifies the Dashboard-config-agent 252, which is subscribed to the CRO 505 of a particular CRD type that dashboard files are available along with the files contained in the CRO 505. Dashboard-config-agent 252 can then identify the correct PaaS component instance (e.g., via a namespace of the CNF with which the CRO 505 is associated) and make a POST API call to particular instance of Kibana™ 150 to install these dashboards contained in the CROs on a particular Kibana™ instance as described above. Accordingly, Kibana™ 150 is provided with new dashboards upon deployment of the CNF without requiring special scripting in the Helm™ Chart specifying that they be installed.

Figure 6:
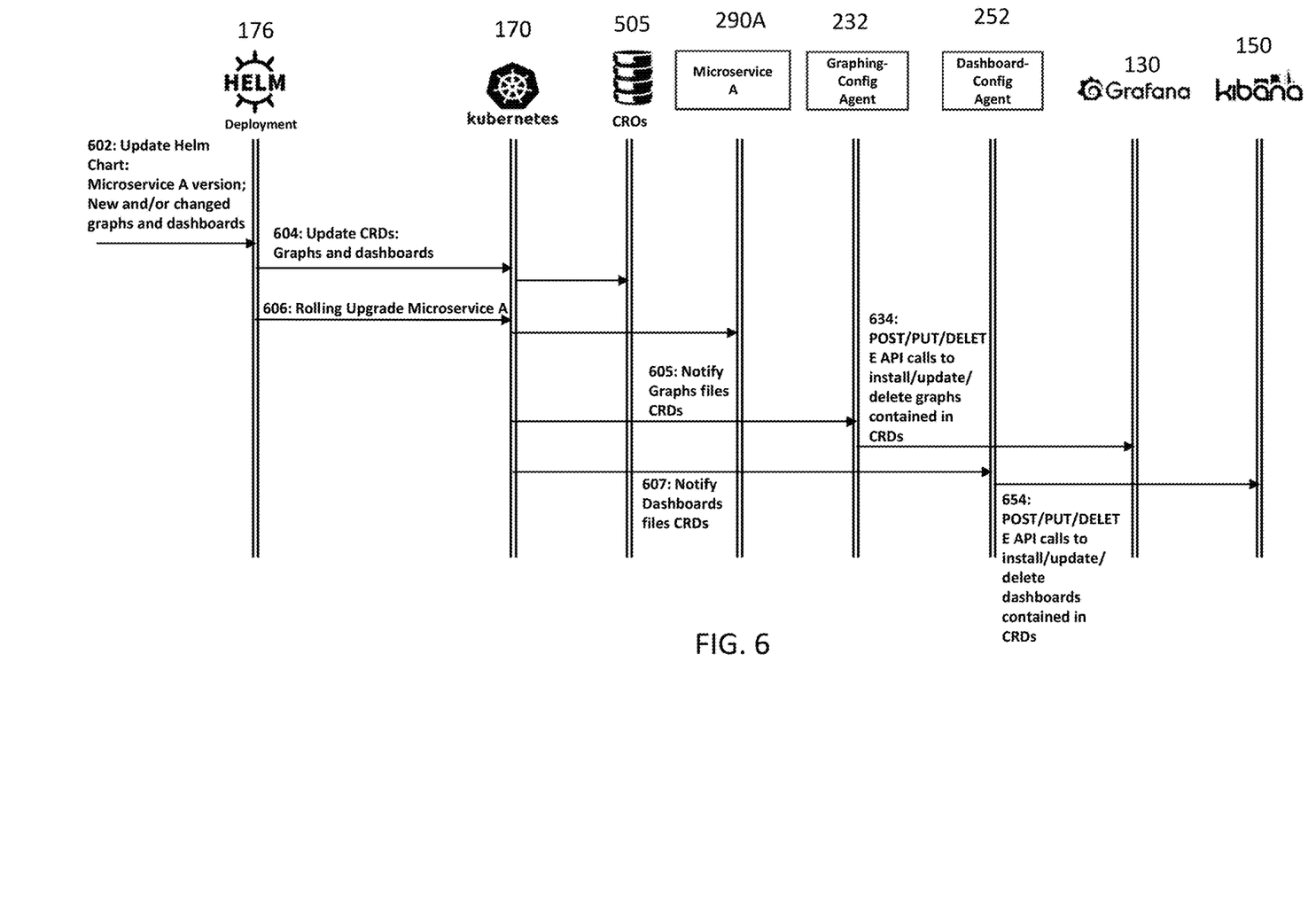
FIG. 6 shows a call flow diagram for a PaaS auto-configuration during a microservice upgrade, according to some embodiments.

FIG. 6 is a call flow diagram showing a PaaS auto-configuration during a CNF upgrade using CRDs, according to some embodiments. At 602, a Helm™ Chart is updated, for example, by a developer delivering a new version thereof that indicates new docker image versions and/or metadata. This update can be similar to the one discussed with reference to FIG. 4, but can use CRDs in combination with config-agents. At 604, Helm™ 176 can call Kubernetes™ 170 to provide an update, which Kubernetes™ 170 can use to update object(s) in CRO 505. In response, at 605 and 607, Kubernetes™ 170 notifies all subscribing config-agents (e.g., those that operate CROs of the particular CRD type of CROs 505), such as Graphing-config-agent 232 and Dashboard-config-agent 252 that there are new or updated dashboard files and passes the files in the CROs 505 to the config-agents 232, 252. Graphing-config-agent 232 and Dashboard-config-agent 252 then execute POST/PUT/DELETE API calls to install/update/delete any new or updated dashboards to instances Grafana™ 130 and Kibana™ 150, respectively, associated with the updated CNF in steps 634/654. In 606, Helm™ 176 may instruct Kubernetes™ 170 to upgrade microservices as specified in the Helm™ Chart (e.g., loading new software from docker images) in step 606.

In some embodiments, a Config-Agent can further monitor PaaS component instances to ensure that configurations thereof are consistent with declarations contained in the CROs and/or ConfigMaps monitored by the Config-Agent. For example, if a PaaS component instance fails and is re-instantiated without the necessary configuration information, the Config-Agent can identify that the configuration of the PaaS component instantiation is either incomplete or missing (e.g., via an API call) and push the necessary configuration information thereto (e.g., via an API call). Accordingly, a Config-Agent can ensure that adequate configuration is installed on PaaS component instances at all times whenever a difference occurs between CROs and/or ConfigMaps monitored by the Config-Agent and the associated PaaS component instance, regardless of where the difference occurred from.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input. The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method comprising:
   installing a service instance using a first descriptor chart, the installing comprising:
      installing a plurality of microservices declared in the first descriptor chart that comprise the service instance, at least one of the microservices configured to request services from an instance of a Platform-as-a-Service ("PaaS") component of a PaaS component type, and
      creating at least one configuration file based on the first descriptor chart;
      storing the at least one configuration file;
   parsing, by a configuration agent associated with the PaaS component type, the at least one configuration file for configuration data associated with the PaaS component;
   instructing, by the configuration agent, the instance of the PaaS component to install the configuration data;
   updating the service instance using a second descriptor chart, the updating comprising:
      updating at least one of the plurality of microservices declared in the second descriptor chart that comprise the service instance, the updated at least one of the plurality of microservices configured to request services from the instance of the PaaS component, and updating the at least one configuration file based on the second descriptor chart;

parsing, by the configuration agent, the at least one updated configuration file to identify the update to the configuration data associated with the PaaS component; and instructing, by the configuration agent, the instance of the PaaS component to install the updated configuration data.

2. The method of claim 1, wherein the configuration file comprises descriptors of resources, and wherein the method further comprises mounting the configuration file to the configuration agent.

3. The method of claim 1, wherein the service instance comprises a network function ("NF").

4. The method of claim 3, wherein the service instance is installed by a network operator, and the PaaS component is developed and managed by a third-party.

5. The method of claim 1, wherein the updating the service instance is performed by a container orchestration engine ("COE").

6. A method comprising:

monitoring, by a first configuration agent associated with a first Platform-as-a-Service ("PaaS") component type, for a notification identifying a configuration file change in at least one configuration file directory, at least one configuration file in the at least one configuration file directory containing configuration data for at least one instance of the first PaaS component of the PaaS component type;

monitoring, by a second configuration agent associated with a second Platform-as-a-Service ("PaaS") component type, for a notification identifying a configuration file change in the at least one configuration file directory, the at least one configuration file in the at least one configuration file directory containing configuration data for at least one instance of the second PaaS component of the PaaS component type;

monitoring, by the first configuration agent a configuration of the at least one instance of the first PaaS component type to identify a lack of conformity with configuration data in the at least one configuration file directory;

monitoring, by the second configuration agent a configuration of the at least one instance of the second PaaS component type to identify a lack of conformity with configuration data in the at least one configuration file directory; and automatically transmitting, by the first configuration agent and the second configuration agent an instruction to the at least one instance of the first PaaS component and the second PaaS component when one or more of a configuration file change or a lack of conformity is identified, the instruction comprising an instruction to install a configuration on the at least one instance of the first PaaS component and the second PaaS component based on the configuration data in the at least one configuration file directory.

7. The method of claim 6, wherein the at least one instance of the first PaaS component and the second PaaS component is configured to service at least one microservice of a plurality of microservices comprising a network function ("NF").

8. The method of claim 6, wherein the configuration file change comprises a change in data of a ConfigMap in the at least one configuration file directory.

9. The method of claim 6, wherein the configuration data is associated with at least one service instance, and wherein the method further comprises updating the at least one service instance using a descriptor chart, the updating the at least one service instance causing the configuration file change.

10. The method of claim 9, wherein the at least one service instance is updated by a network operator, and the at least one of the first PaaS component and the second PaaS component is developed and managed by a third-party.

11. A method comprising:

installing a service instance using a first descriptor chart, the installing comprising:

installing a plurality of microservices declared in the first descriptor chart that comprise the service instance, at least one of the microservices configured to request services from an instance of a Platform-as-a-Service ("PaaS") component of a PaaS component type, and creating at least one resource instance based on the first descriptor chart, the resource instance having a type associated with a resource definition, the resource instance containing configuration data associated with the instance of the PaaS component;

storing the at least one resource instance;

receiving, by a configuration agent that operates resource instances of the type associated with the resource definition, a notification of the creation of the at least one resource instance, the notification further comprising the configuration data associated with the instance of the PaaS component;

instructing, by the configuration agent, the instance of the PaaS component to install the configuration data;

updating the service instance using a second descriptor chart, the updating comprising:

updating at least one of the plurality of microservices declared in the second descriptor chart that comprise the service instance, the updated at least one of the plurality of microservices configured to request services from the instance of the PaaS component, and updating the at least one resource instance based on the second descriptor chart by updating configuration data in the resource instance associated with the instance of the PaaS component;

receiving, by the configuration agent that operates resource instances of the type associated with the resource definition, a notification of the update to the at least one resource instance, the notification further comprising the updated configuration data associated with the instance of the PaaS component; and instructing, by the configuration agent, the instance of the PaaS component to install the updated configuration data.

12. The method of claim 11, wherein the instructing the instance of the PaaS component to install the configuration data comprises performing, by the configuration agent, an API call to the instance of the PaaS component.

13. The method of claim 11, wherein the service instance comprises a network function ("NF").

14. The method of claim 13, wherein the service instance is installed by a network operator, and the instance of the PaaS component is developed and managed by a third-party.

15. The method of claim 11, wherein the updating the service instance is performed by a container orchestration engine ("COE").

16. A method comprising:
monitoring, by a first configuration agent associated with a first resource definition type, for a notification identifying that a declaration in a resource instance of the first resource definition type has changed, the changed declaration being associated with at least one instance of a first Platform-as-a-Service ("PaaS") component;
monitoring, by a second configuration agent associated with a second resource definition type, for a notification identifying that a declaration in a resource instance of the second resource definition type has changed, the changed declaration being associated with at least one instance of a second Platform-as-a-Service ("PaaS") component;
monitoring, by the first configuration agent, a configuration of the at least one instance of the first PaaS component to identify a lack of conformity with the declaration in the resource instance of the first resource definition type;
monitoring, by the second configuration agent, a configuration of the at least one instance of the second PaaS component to identify a lack of conformity with the declaration in the resource instance of the second resource definition type; and
automatically transmitting, by the first configuration agent and the second configuration agent, an instruction to the at least one instance of the first PaaS component and the second PaaS component when one or more of a declaration change or a lack of conformity is identified, the instruction comprising an instruction to install a configuration on the at least one instance of the first PaaS component and the second PaaS component based on the declaration in the resource instance.

17. The method of claim 16, wherein the at least one instance of the first PaaS component and the second PaaS component is configured to service at least one microservice of a plurality of microservices comprising an instance of a network function ("NF").

18. The method of claim 17, further comprising updating the instance of the NF using a descriptor chart, the updating the instance of the NF causing the declaration change.

19. The method of claim 18, wherein the instance of the NF is updated by a network operator, and at least one of the first PaaS component and the second PaaS component is developed and managed by a third-party.

20. The method of claim 16, wherein the changed declaration comprises a change to a consumable of the at least one instance of at least one of the first PaaS component and the second PaaS component.

* * * * *